US008090173B2

(12) United States Patent
Park

(10) Patent No.: US 8,090,173 B2
(45) Date of Patent: Jan. 3, 2012

(54) SYSTEM AND METHOD FOR BLOOD VESSEL BIFURCATION DETECTION IN THORACIC CT SCANS

(75) Inventor: Sangmin Park, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 660 days.

(21) Appl. No.: 12/276,814

(22) Filed: Nov. 24, 2008

(65) Prior Publication Data

US 2009/0148024 A1  Jun. 11, 2009

Related U.S. Application Data

(60) Provisional application No. 60/990,423, filed on Nov. 27, 2007.

(51) Int. Cl.
*A61B 6/03* (2006.01)
(52) U.S. Cl. ......................... 382/128; 382/134
(58) Field of Classification Search .......... 382/128–134, 382/154; 703/1
See application file for complete search history.

(56) References Cited

U.S. PATENT DOCUMENTS

2007/0086637 A1  4/2007  Zhang
2009/0060298 A1*  3/2009  Weijers et al. ................ 382/128

OTHER PUBLICATIONS

Park et al., Artery-Vein Separation of Human Vasculature from 3D Thoracic CT Angio Scans, Oct. 2006, CompIMAGE 2006, 6 pages plus meeting announcement.*

Ruey-Feng Chang et al., "Solid breast masses: neural network analysis of vascular features at three-dimensional power Doppler US for benign or malignant classification", Radiology, vol. 243, No. 1, Apr. 2007, pp. 56-62.

Baloch, S. et al., "Rotation Invariant Topology Coding of 2D and 3D Objects Using Morse Theory", Image Processing, 2005. ICIP 2005. IEEE International Conference on Genova, Italy Sep. 11-14, 2005, Piscataway, NJ, USA, IEEE, vol. 3, Sep. 11, 2005, pp. 796-799.

Nicolas Flasque, Michel Desvignes, Jean-Marc Constans, Marinette Revenue: "Acquisition, segmentation and tracking of the cerebral vascular tree on 3D magnetic resonance angiography images", Medical Image Analysis, vol. 5, No. 3, Sep. 2001, pp. 173-183.

Juan F. Carrillo et al.: "Extraction of 3D Vascular Tree Skeletons Based on the Analysis of Connected Components Evolution", Computer Analysis of Images and Patterns Lecture Notes in Computer Sciences;;LNCS, Springer, Berlin, DE, vol. 3691, Jan. 1, 2005, pp. 604-611.

(Continued)

*Primary Examiner* — Edward Glick
*Assistant Examiner* — John Corbett
(74) *Attorney, Agent, or Firm* — Peter Withstandley

(57) ABSTRACT

A method for detecting blood vessel bifurcations in digital medical images includes inflating a sphere from a first center point inside a segmented blood vessel until a surface of the sphere intersects a surface of the blood vessel, searching within the inflated sphere for a second center point that has a sphere intersecting a surface of the blood with a maximum radius, assigning all voxels of the maximal radius sphere to a root node of a shape-tree, increasing the radius of the maximal radius sphere and computing a voxel difference set with respect to the previous maximal radius sphere, computing one or more connected components $C_m$ in the voxel difference set, assigning voxels of each connected components to a different child node of the shape tree, connecting each child node with the root node, and calculating features from the shape tree for training a classifier to detect blood vessel bifurcations.

27 Claims, 7 Drawing Sheets

OTHER PUBLICATIONS

Juan F. Carrillo, Marcela Hernández Hoyos, Eduardo E. Dávila, and Maciej Orkisz: "Recursive tracking of vascular tree axes in 3D medical images", International Journal of Computer Assisted Radiology and Surgery, vol. 1, No. 6, pp. 331-339, Published on line Feb. 2, 2007.

Chang R F, et al. "Computer algorithm for analysing breast tumor angiogenesis using 3-D power Doppler ultrasound", Ultrasound in Medicine and Biology, New York, NY, US, vol. 32, No. 10, Oct. 1, 2006, pp. 1499-1508.

Shu-Yen Wan et al., "Extraction of the Hepatic Vasculature in Rats Using 3-D Micro-CT Images" IEEE Transactions on Medical Imaging, IEEE Service Center, Piscataway, NJ, US, vol. 19, No. 9, Sep. 1, 2000.

Partial International Search in International Application No. PCT/US2008/013111 dated Jan. 11, 2010.

\* cited by examiner (a) (b)

(a)

(b)

(c)

(d)

(e)

SYSTEM AND METHOD FOR BLOOD VESSEL BIFURCATION DETECTION IN THORACIC CT SCANS

CROSS REFERENCE TO RELATED UNITED STATES APPLICATIONS

This application claims priority from "Blood Vessel Bifurcation Detection in Thoracic CT Scans", Provisional Application No. 60/990,423 of Sangmin Park, filed Nov. 27, 2007, the contents of which are herein incorporated by reference in their entireties.

TECHNICAL FIELD

This disclosure is directed to the construction of classifiers for the detection of blood vessel bifurcations in digital medical images.

DISCUSSION OF THE RELATED ART

Current computer aided detection (CAD) nodule detection algorithms generate many false positives in vessel junctions. The performance of these algorithms can be increased by removing the false positive candidates. In one prior art CAD system, an enclosed box was designed for this purpose, by constructing a bounding box about a nodule and then counting the number of intersections with the cube. However, this detection method does not take into account the intersection area, which could be used for blood flow computation.

The shape-tree is a skeletal tree representation for defining geometric features, based on the Reeb graph, a data structure for understanding and representing the topology and shapes. The Reeb graph is a fundamental data structure that encodes the topology of a shape. It is obtained by contracting to a point the connected components of the level-sets (also called contours) of a function defined on a mesh. The Reeb graph has been used extensively in a wide range of 3D geometric data processing applications, such as shape matching, encoding, compression, surface parameterization, and iso-surface remeshing and simplification. Reeb graphs can determine whether a surface has been reconstructed correctly, indicate problem areas, and can be used to encode and animate a model.

Given a mesh M with a piecewise linear function F sampled at its vertices, the level-set at a value s is defined as the set of points in M with function value equal to s. The connected components of the level-sets of F are called contours. The Reeb graph RG of F is obtained by contracting the contours of F to points. Points on the Reeb graph that correspond to contours passing through critical points of F (e.g., maxima, minima, and saddles) are called nodes. The rest of the Reeb graph consists of arcs connecting the nodes. Since contours change topology only at critical points, an arc represents a family of contours that do not change topology. For a PL function, the critical points lie on the vertices of M and nodes can be associated with vertices of M.

Reeb graphs, and especially their loop-free specialization called contour trees, are popular in computer graphics and visualization. However, there has been little research on using Reeb graphs in connection with image volume data.

SUMMARY OF THE INVENTION

Exemplary embodiments of the invention as described herein generally include methods and systems for constructing a shape-tree and quantifying the shape tree structure to define features suitable for training a classifier for detecting bifurcations in pulmonary blood vessels. Since most false positives of a lung nodule detection algorithm result from blood vessel bifurcations, a method according to an embodiment of the invention can improve detection performance by removing these candidates. A method according to an embodiment of the invention can create a shape tree from a blood vessel and quantify the blood vessel shape tree in a feature matrix for the purpose of training a classifier. Most classifiers use an n×m feature matrix for training, wherein n represents the number of candidates and m is the number of features. However, it is challenging to convert a shape tree structure into a matrix, as a shape-tree structure differs from candidate to candidate. A method according to an embodiment of the invention can quantify a shape-tree and convert it to an n×m feature matrix.

According to an aspect of the invention, there is provided a method for detecting blood vessel bifurcations in digital medical images, the method including providing a binary segmented 3D image volume having a segmented blood vessel, inflating a sphere from a first center point inside a segmented blood vessel until a surface of the sphere intersects a surface of the blood vessel, searching within the inflated sphere for a second center point that has a sphere intersecting a surface of the blood with a maximum radius, assigning all voxels of the maximal radius sphere to a root node of a shape-tree, increasing the radius of the maximal radius sphere, and computing a voxel difference set with respect to the previous maximal radius sphere, computing one or more connected components $C_m$ in the voxel difference set, assigning voxels of each connected components to a different child node of the shape tree, and connecting each child node with the root node, and calculating features from the shape tree for training a classifier to detect blood vessel bifurcations.

According to a further aspect of the invention, the blood vessel surface comprises exterior voxels of the binary segmented 3D image volume.

According to a further aspect of the invention, the center point is input either manually or by another application.

According to a further aspect of the invention, the method includes selecting a second center point nearest to the first center point, when there is more than one center point with a maximum radius sphere.

According to a further aspect of the invention, the radius of the maximal radius sphere is increased by one voxel unit.

According to a further aspect of the invention, the voxel difference set is defined by $M_k = V(S_{m+k\times U}) - V(S_{m+(k-1)\times U})$, where $V(S_r)$ represents a number of voxels inside a sphere of radius r, m is the radius of the maximal radius sphere, k is an iteration counter equal to 1 at a first iteration, and U is the voxel unit.

According to a further aspect of the invention, the method includes increasing the radius of the maximal radius sphere by another voxel unit, incrementing a level of the shape tree by one, and repeating the steps of computing a voxel difference set, computing one or more connected components, and assigning voxels of each connected components to a different child node, until there are no more connected components in the voxel different set.

According to a further aspect of the invention, the method includes repeating the steps of computing a voxel difference set, computing one or more connected components, and assigning voxels of each connected components to a different child node, until $m+k\times U \leq R_{max}$ where $R_{max}$ is a predetermined maximum.

According to a further aspect of the invention, at each new shape tree level, the child node of a connected component is connected to a parent node at a previous shape level, where a parent node ($N_{(i-1)j}$) represents those voxels at a previous radius that are adjacent to the voxels of the connected component, where if there is more than one parent node having voxels adjacent to the connected component, selecting the node with greatest number of adjacent voxels as the parent node.

According to a further aspect of the invention, the connected components are calculated using a 26-neighbor connectivity in the voxel grid.

According to a further aspect of the invention, the method includes providing a digital medical image volume, comprising a plurality of intensities associated with an 3-dimensional grid of voxels, where the binary segmented 3D image volume is derived from the digital medical image volume.

According to a further aspect of the invention, the method includes simplifying the shape tree by merging each child node having no sibling nodes with its parent node, and calculating for each branch after merging all consecutive child nodes in the branch, a square sum of the surface area differences between a pair of next-nearest neighbor nodes feature, $$D_1 = \frac{\sum_{i=1}^{n-1}(S_i - S_{i+1})^2}{(n-1) \times \sum_{i=1}^{n-1} D(C_i, C_{i+1})},$$

a sum of the area differences between a first node and a half way node of a shape tree branch, and between the half way node and a last node of the shape tree branch feature, $$D_2 = \frac{(S_1 - S_{n/2})^2 + (S_{n/2} - S_n)^2}{2 \times \sum_{i=1}^{n-1} D(C_i, C_{i+1})},$$

an area difference between the first and last nodes of a shape tree branch feature, $$D_3 = \frac{(S_1 - S_n)^2}{\sum_{i=1}^{n-1} D(C_i, C_{i+1})},$$

and a total branch feature, $D_4 = w_1 \times D_1 + w_2 \times D_2 + w_3 \times D_3$, where $S_i$ represents the surface area at the $i^{th}$ node in a branch, $D(C_i, C_{i+1})$ is a distance function between the two center locations $C_i$ and $C_{i+1}$, of $S_i$ and $S_{i+1}$, and n is the number of nodes having only one child, where the features $D_1$, $D_2$, $D_3$, and $D_4$ characterize a shape of the vessel represented by the shape tree.

According to another aspect of the invention, there is provided a program storage device readable by a computer, tangibly embodying a program of instructions executable by the computer to perform the method steps for detecting blood vessel bifurcations in digital medical images.

DETAILED DESCRIPTION OF EXEMPLARY EMBODIMENTS

Figure 1:
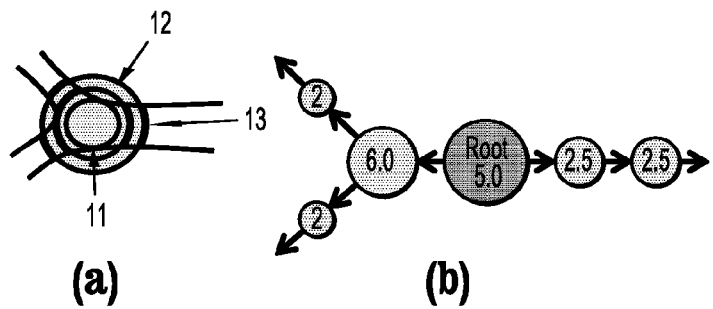
FIGS. 1(a)-(b) depicts a blood vessel bifurcation and its shape-tree structure, according to an embodiment of the invention.

Exemplary embodiments of the invention as described herein generally include systems and methods for constructing a shape-tree and quantifying the shape tree structure. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 2:
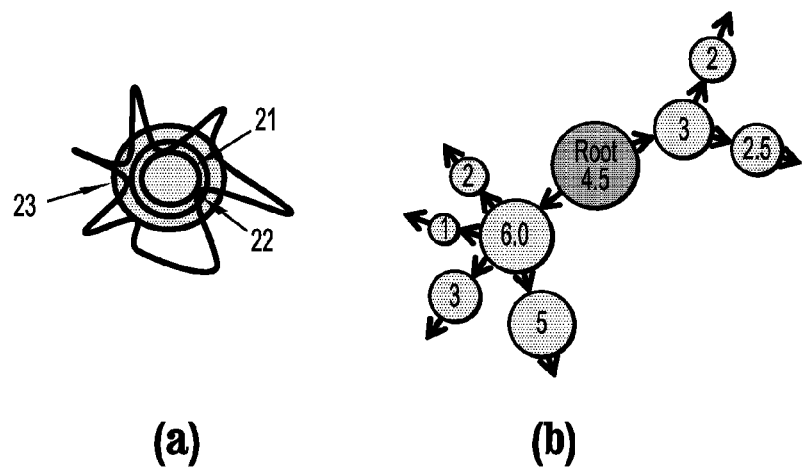
FIGS. 2(a)-(b) depicts a spiculated nodule and its shape-tree structure, according to an embodiment of the invention.
Figure 3:
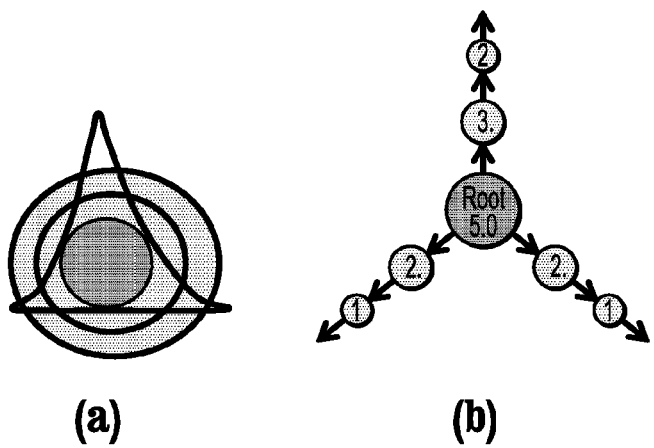
FIGS. 3(a)-(b) depicts a triangular object and its shape-tree, according to an embodiment of the invention.

The shape-tree is a tree structure that can describe the shape of an object in 3D space. It can, for example, differentiate lung nodules from blood vessels, fissures, and other structures. FIGS. 1(a)-(b) illustrates a blood vessel bifurcation in FIG. 1(a) and its corresponding shape-tree structure in FIG. 1(b). FIG. 1(a) shows how a largest sphere 11 within the segmented vessel is grown beyond the vessel surfaces, and the connected components that result. As the sphere inflates, at first, two connected components 12 will appear, then three connected components 13. Each circle in FIG. 1(*b*) represents a tree node and the numbers are the radius at the intersection surfaces between the blood vessels and the spheres. FIGS. 2(*a*)-(*b*) depicts a spiculated nodule in FIG. 2(*a*) with a largest sphere with the segmented blood vessel 21, a surface with 2 connected components 22, and a surface with 5 connected components 23, and its shape-tree structure in FIG. 2(*b*). This shape tree branches off in all directions and the radii of the intersection surfaces become smaller. This is an abnormal case, as the number of connected components can be greater than three. FIGS. 3(*a*)-(*b*) illustrates another example, that of a triangular object in FIG. 3(*a*) and its shape-tree in FIG. 3(*b*). The shape tree has only three branches from the root and the radii of the intersection surfaces decrease.

Figure 4:
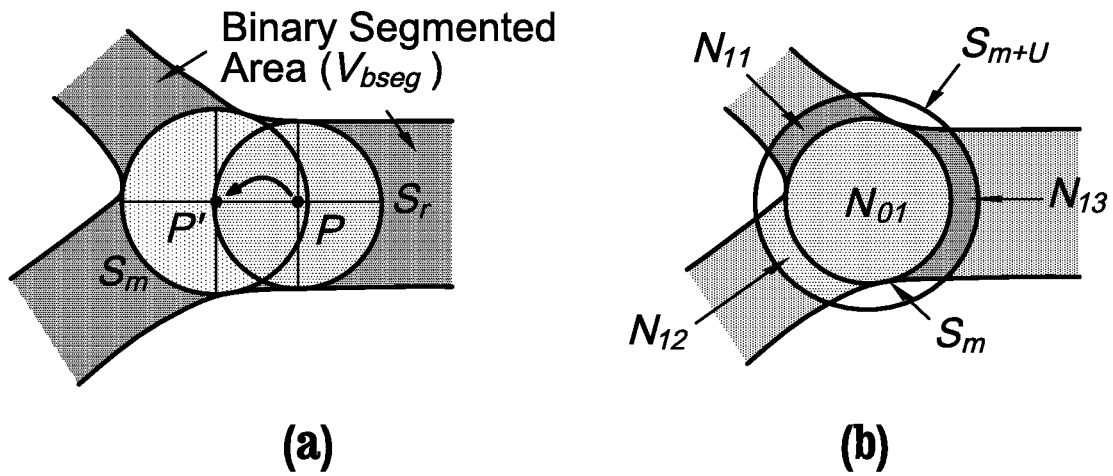
FIGS. 4(a)-(b) illustrates how the initial sphere $S_r$ is inflated and how the radius of $S_m$ increases by one voxel unit U, according to an embodiment of the invention.

A shape-tree can be constructed from a binary segmented 3D volume in which voxels are located at the 3D orthogonal grid intersections. A flowchart of a shape-tree construction algorithm according to an embodiment of the invention is presented in FIG. 6. Referring now to the figure, and referring also to FIGS. 4 and 5, a shape-tree construction algorithm begins at step 60 by computing the binary segmented 3D volume $V_{bseg}$ for the target area. At step 61, a sphere $S_r$ is inflated, where r represents the radius, at a location P until its surface hits the boundary of $V_{bseg}$ in the voxel grid space, where the boundary is defined as the exterior voxels of $V_{bseg}$, and P can be a manual input or be provided from another application. At step 62, one searches for a center location P' within $S_r$ that maximize the radius and let $S_m$ be the maximum radius sphere at P'. If two or more spheres have the same radius, the nearest sphere to the center of $S_r$ is selected. FIG. 4(*a*) illustrates how the initial sphere $S_r$ is inflated from the given point P until its surface hits the boundary of the binary segmented image $V_{bseg}$. At step 63, assign all voxels of $V(S_m)$ to a root node $N_{01}$ of the shape-tree, where V(S) identifies the voxels of $V_{bseg}$ within the structure S and $N_{ij}$ represents the $j^{th}$ node at the $i^{th}$ level, where i=0 and j=1 for the root node. At step 64, increase the radius of $S_m$ by one voxel unit, U, and compute the voxel set difference as $M_k = V(S_{m+k \times U}) - V(S_{m+(k-1) \times U})$, where k=1 at the first iteration. The connected components $C_m$ in $M_k$ are computed at step 65, with a 26-neighbor connectivity in the voxel grid space, where $C_m$ is the $m^{th}$ connected component. The tree level is increased as i=i+1 at step 66. At step 67, for each $C_m \in M_k$, $\forall m$, the following steps are performed. (a) Find a parent node $(N_{(i-1)j})$ whose voxels are adjacent to the voxels of $C_m$. If there is more than one neighboring parent node, select the node with greatest number of adjacent voxels as the parent node. (b) Assign all voxels of $V(C_m)$ to $N_{im}$. (c) Connect the two nodes with the parent $N_{(i-1)j}$ and the child $N_{im}$ relations. The radius is increased as k=k+1 at step 68. Steps 64 to 68 are repeated from step 69 until there are no more connected components in $M_k$ or m+k× U≦$R_{max}$. An exemplary, non-limiting value of $R_{max}$ is $R_{max}$=26U. FIG. 4(*b*) illustrates how the radius of $S_m$ increases by one voxel unit U, and the connected components are computed in the voxel set of $V(S_{m+U}) - V(S_m)$. The adjacent connected components are connected with the parent-child relations. FIG. 4(*b*) shows the root node and the first level of the connected components, and FIG. 5(*a*) is a constructed tree structure that has three levels.

To minimize redundant tree structures, the given point P can be moved to P' at step 62. If the sphere is inflated from P, the tree structure will have only two branches until some level, when one of them splits into two branches. In this case, the branched node from the root node is a redundant structure for representing the tri-furcation. Therefore, the third step is to minimize the unnecessary structures.

Step 67(*a*) makes the structures trees instead of graphs, since each connected component is connected to only one parent. It is a simplified version of Reeb graph and usable for medical images that do not contain loops. For example, for healthy persons, blood vessels and bronchus do not have doughnutlike shapes within small regions (<$R_{max}$).

For the traditional supervised learning, a set of input vectors $\{x_n\}_{n=1}^N$ is given along with the corresponding targets $\{t_n\}_{n=1}^N$ that can be labels for classification. It is assumed that each input vector has the same length. However, it is challenging to convert tree structures to same length vectors, since each tree can have different numbers of levels and branches. Therefore, an embodiment of the invention includes a tree quantification method for training a classifier.

A quantification according to an embodiment of the invention measures the shape of each branch. To measure the branch shape, the shape-tree structure is simplified. If a child node does not have siblings, it is merged to the parent node. This process is repeated for each node from the root node to the leaf nodes, while quantities $D_1$, $D_2$, $D_3$, and $D_4$ are computed for each branch after all consecutive child nodes on that branch have been merged, as indicated below.

$$D_1 = \frac{\sum_{i=1}^{n-1}(S_i - S_{i+1})^2}{(n-1) \times \sum_{i=1}^{n-1} D(C_i, C_{i+1})}, \quad (1)$$

$$D_2 = \frac{(S_1 - S_{n/2})^2 + (S_{n/2} - S_n)^2}{2 \times \sum_{i=1}^{n-1} D(C_i, C_{i+1})}, \quad (2)$$

$$D_3 = \frac{(S_1 - S_n)^2}{\sum_{i=1}^{n-1} D(C_i, C_{i+1})}, \quad (3)$$

$$D_4 = w_1 \times D_1 + w_2 \times D_2 + w_3 \times D_3, \quad (4)$$

where $S_i$ represents the surface area at the $i^{th}$ node in a simplified branch and $D(C_i, C_{i+1})$ is a distance function between the two center locations, $C_i$ and $C_{i+1}$, of $S_i$ and $S_{i+1}$, and n=the number of nodes that have only one child, (n>2). Exemplary, non-limiting values of the weighting constants are $w_1$=0.2, $w_2$=0.3, and $w_3$=0.5.

Figure 5:
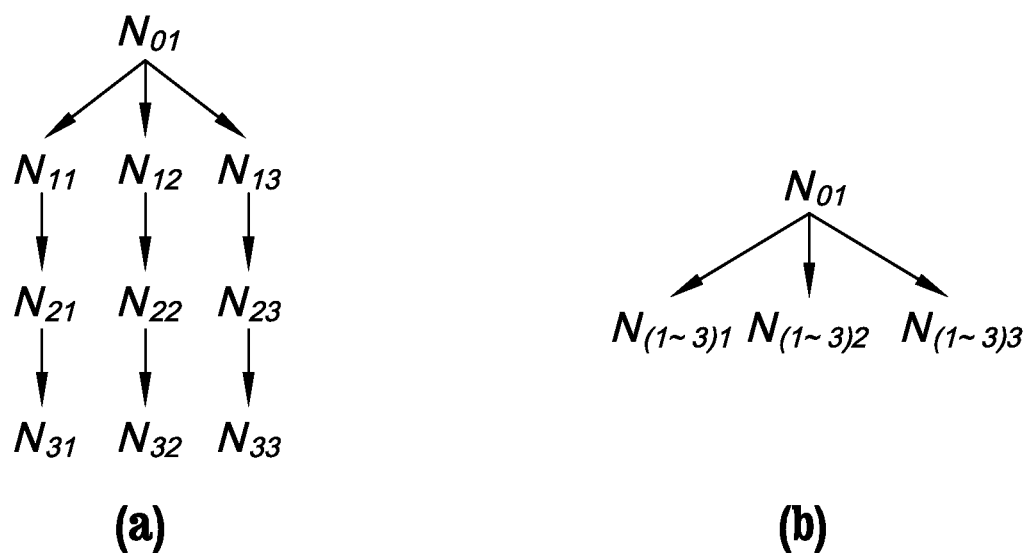
FIGS. 5(a)-(b) illustrates tree representing the connected components and its simplification, according to an embodiment of the invention.
Figure 6:
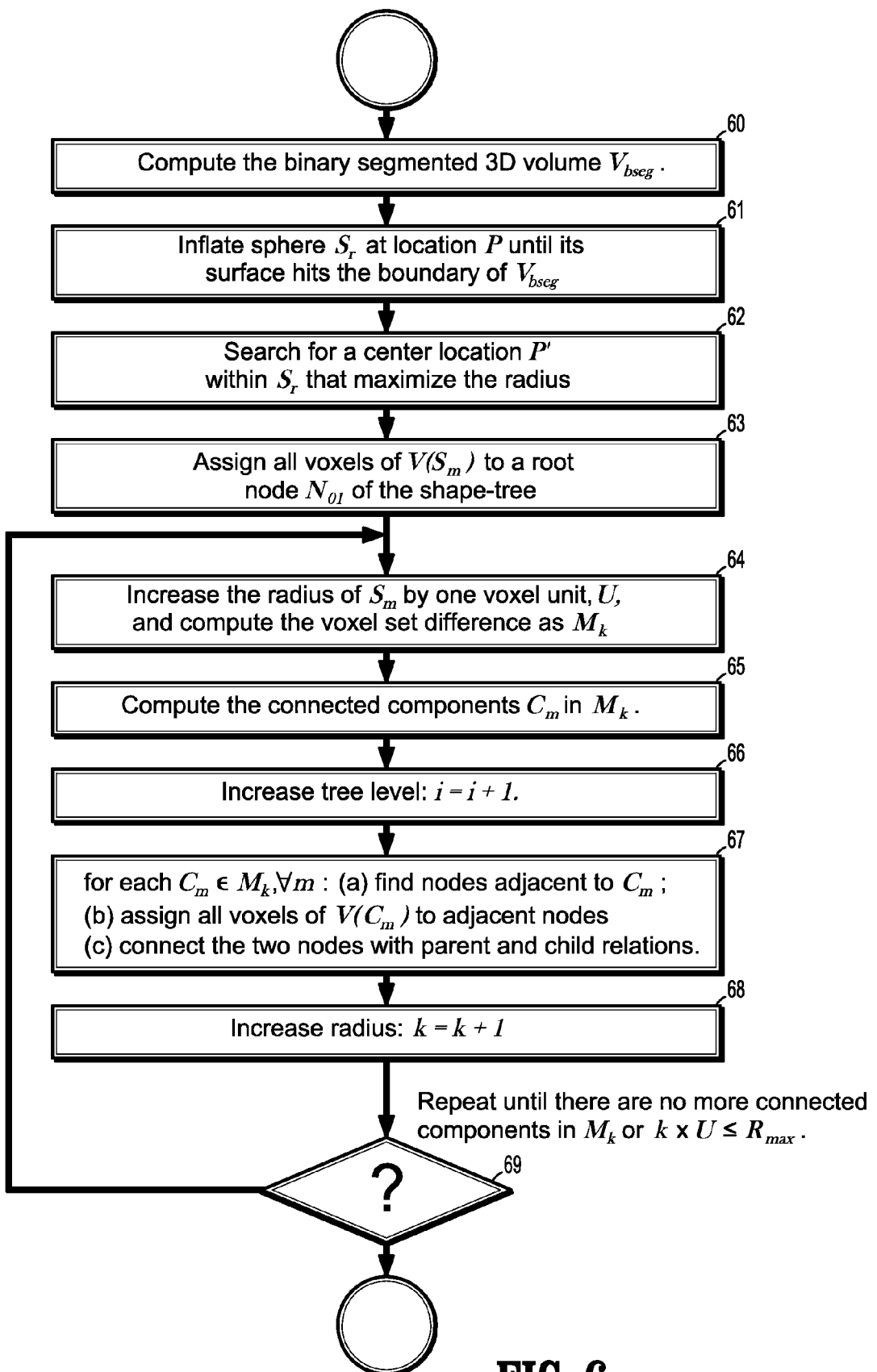
FIG. 6 is a flowchart of a method for constructing a shape-tree and quantifying the shape tree structure, according to an embodiment of the invention.

FIG. 5(*b*) depicts a tree structure simplified from the tree structure of FIG. 5(*a*). In the simplification, if a node has only one child, the child node is merged to the parent. $N_{(1-3)1}$ represents that the three nodes, $N_{11}$, $N_{21}$, and $N_{31}$, are merged, and similarly for nodes $N_{(1-3)2}$ and $N_{(1-3)3}$.

The quantities $D_1$, $D_2$, $D_3$, and $D_4$ are branch features, with individual branch features $D_1$, $D_2$, and $D_3$, that involve surface area differences between nodes in the tree, and a total branch feature $D_4$ that is a weighted sum of the individual branch features. The individual branch features are computed only when the number of nodes is greater than 2. The $D_1$ feature is the square sum of the surface area differences between a node and its next neighbor node. The $D_2$ feature is the sum of the area differences between the first node and the half way node, and between the half way node and the last node. The $D_3$ feature is the area difference between only the first and last nodes.

Figure 7:
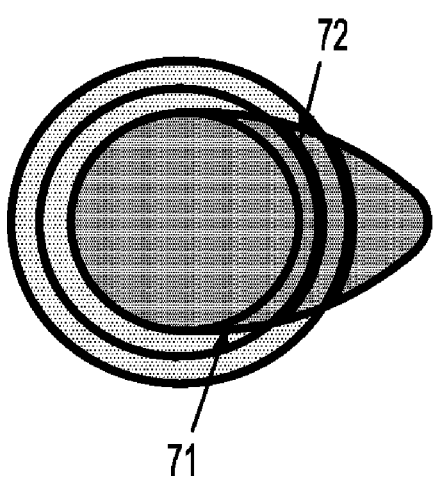
FIGS. 7(a)-(b) illustrates the simplification of a tree for an oblong object, according to an embodiment of the invention
Figure 7:
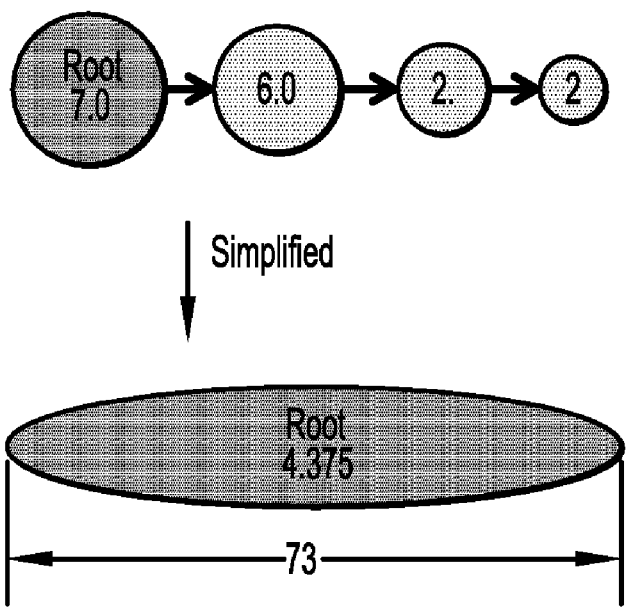

FIGS. 7(*a*)-(*b*) illustrates the simplification of a tree for an oblong object, according to an embodiment of the invention. FIG. 7(*a*), on the left, depicts an oblong object that is a target to be analyzed, with a largest sphere 71 inside the segmented vessel, and one connected component 72. The upper figure of FIG. 7(*b*) depicts the shape tree for this oblong object, and the numbers inside the circles represent the radii at the intersection surface between the blood vessel and the sphere being inflated. Each node in this tree has only one child node, so it can be collapsed into a single node, depicted as the ellipse in the lower figure of FIG. 7(*b*). The number inside the ellipse is the length of the root branch 73. The root length is computed by adding the following two values: (the number of merged nodes)×(voxel size (in mm))+(the radius of root node (before simplification)). Note that according to an embodiment of the invention, voxels are assumed to be cubical.

Once the shape tree has been constructed from the vessel, other features can be calculated. The features can be categorized as basic features, flow features, and branch features. The branch features are calculated as described above.

The basic features include: (1) The total length of the root branch in millimeters; (2) the minimum intensity value at the root node sphere; (3) the maximum intensity value at the root node sphere; (4) the average intensity value at the root node sphere; (5) the maximum number of tree levels; (6) the minimum distance to the inside lung segmentation wall; and (7) the minimum distance to the outside lung segmentation wall.

The flow features include computing the maximum volume capacity at each level from 0-7, where the volume capacity means the summation of the surface area for all branches at each level of the tree.

Figure 8:
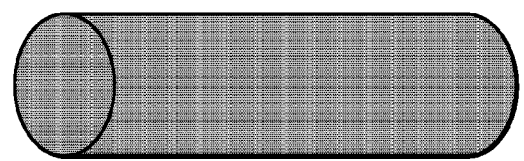
FIGS. 8(a)-(e) illustrates some basic shapes that can be identified by a method according to an embodiment of the invention.
Figure 8:
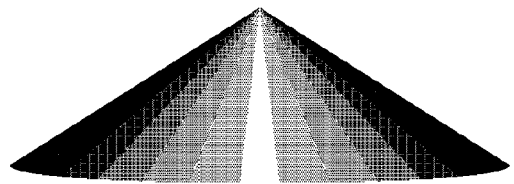
Figure 8:
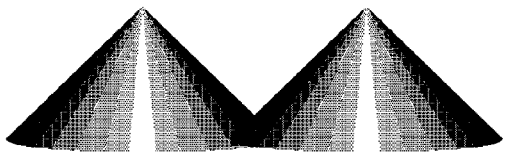
Figure 8:
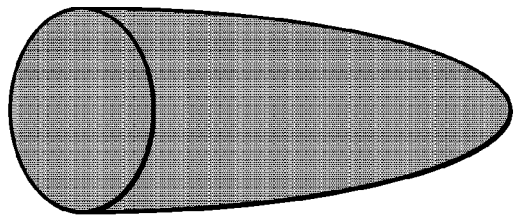
Figure 8:
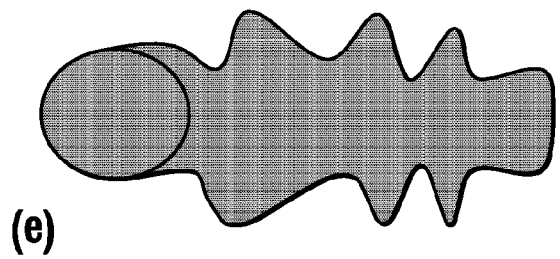

The branch features can characterize the shape of each branch. If the $D_1$, $D_2$, and $D_3$ values of a branch are close to zero, the branch has a high chance to be a cylinder. If $D_1$ is small, but $D_3$ is big, it is likely to be a cone. FIGS. 8(*a*)-(*e*) illustrates various possibilities. FIG. 8(*a*) depicts a cylinder, for which $D_1 \approx D_2 \approx D_3 \approx 0$ and $D_4 \approx 0$. Most blood vessels will have this shape. FIG. 8(*b*) depicts a cone shape, for which $D_1 \approx 0$, $D_2 < D_3$, and $D_4$ is high. Most tetrahedron-like objects have this shape. FIG. 8(*c*) depicts two attached cones for which $D_1 \approx 0$, $D_2 > D_3$, and $D_4$ is a medium value, neither high nor low. FIG. 8(*d*) depicts a half egg shape, for which $D_1 \approx 0$, $D_2 < D_3$, and $D_4$ is high. Most lung nodules have this shape. Finally, FIG. 8(*e*) depicts a long, spiculated shape, for which $D_1 > D_2$, $D_1 > D_3$, $D_2 \approx D_3 \approx 0$, and $D_4$ is low. This type of shape is typical of scars and amorphous objects.

Figure 9:
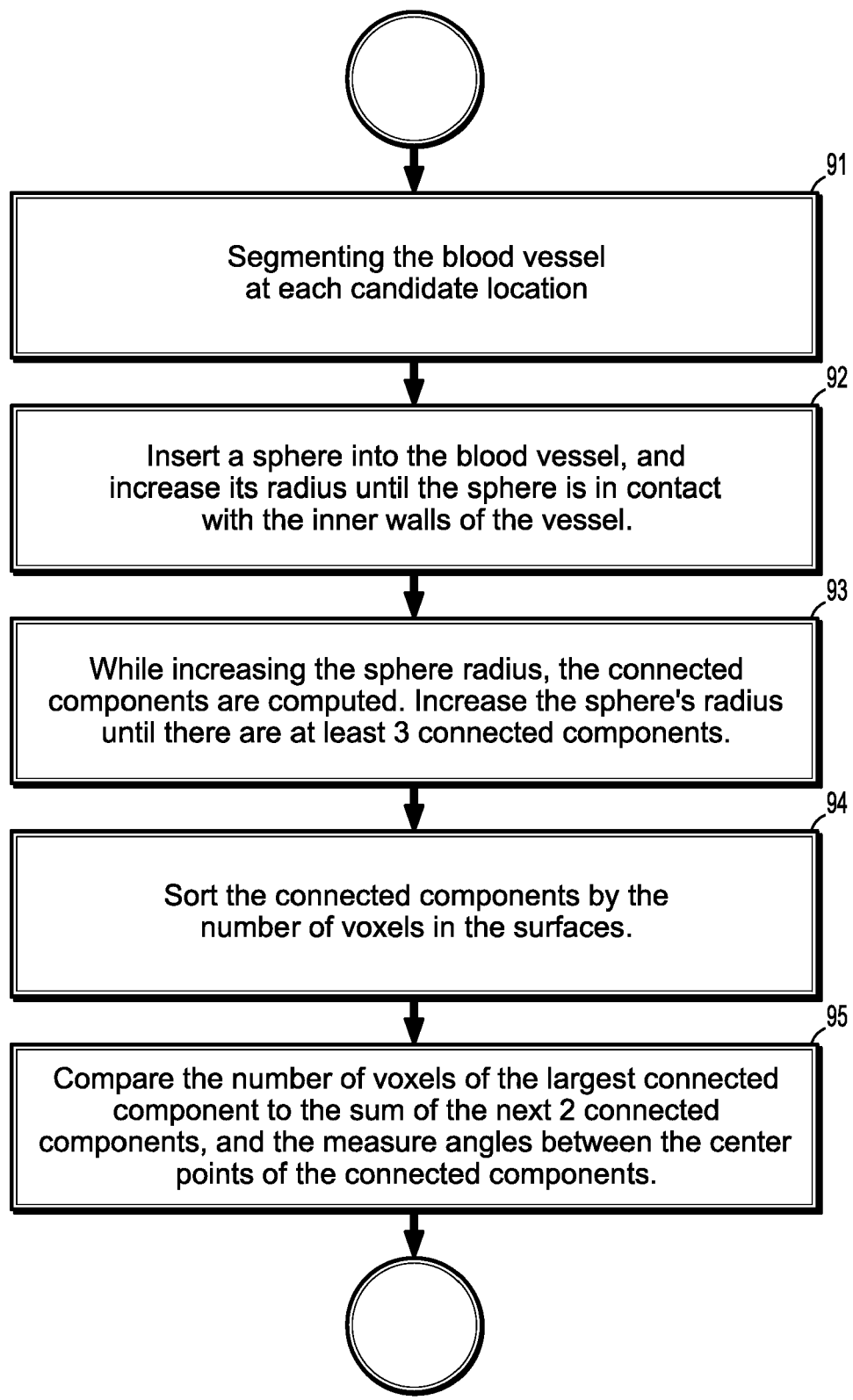
FIG. 9 is a flowchart of a method for detecting blood vessel bifurcations, according to an embodiment of the invention.

A method according to an embodiment of the invention of constructing a shape tree can also be applied in another embodiment of the invention to segmenting blood vessel bifurcations. A flowchart of a method for detecting blood vessel bifurcations, according to an embodiment of the invention, is presented in FIG. 9. Referring now to the flowchart, and also referring to FIG. 1(*a*), a bifurcation detection method begins at step 91 by segmenting or classifying the blood vessel at each candidate location identified by a candidate generation stage of a CAD system. Within the segmentation, at step 92, a sphere 11, shown in FIG. 1(*a*), is inserted into the blood vessel, and its radius is increased until the sphere is in contact with the inner walls of the vessel. At step 93, while increasing the sphere radius by one unit, connected components are computed. The sphere's radius is increased until there are at least 3 connected components. FIG. 1(*a*) depicts the sphere at a stage in which there are 2 connected components 12, and at the 3 connected component stage 13. At step 94, the connected components are sorted by the number of voxels in the surfaces. At step 95, the number of voxels of the largest connected component is compared to the sum of the voxels of the next 2 connected components, and the angles between the center points of the connected components is measured. For normal bifurcation the connected component with largest number of voxels should be approximately equal to the sum of the voxels of the other 2 connected components, so that flow is approximately conserved, and the angles between the center points of the connected components should be similar to those of known cases, i.e., within one or two standard deviations of average angles derived from a distribution of known blood vessel bifurcations.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 10:
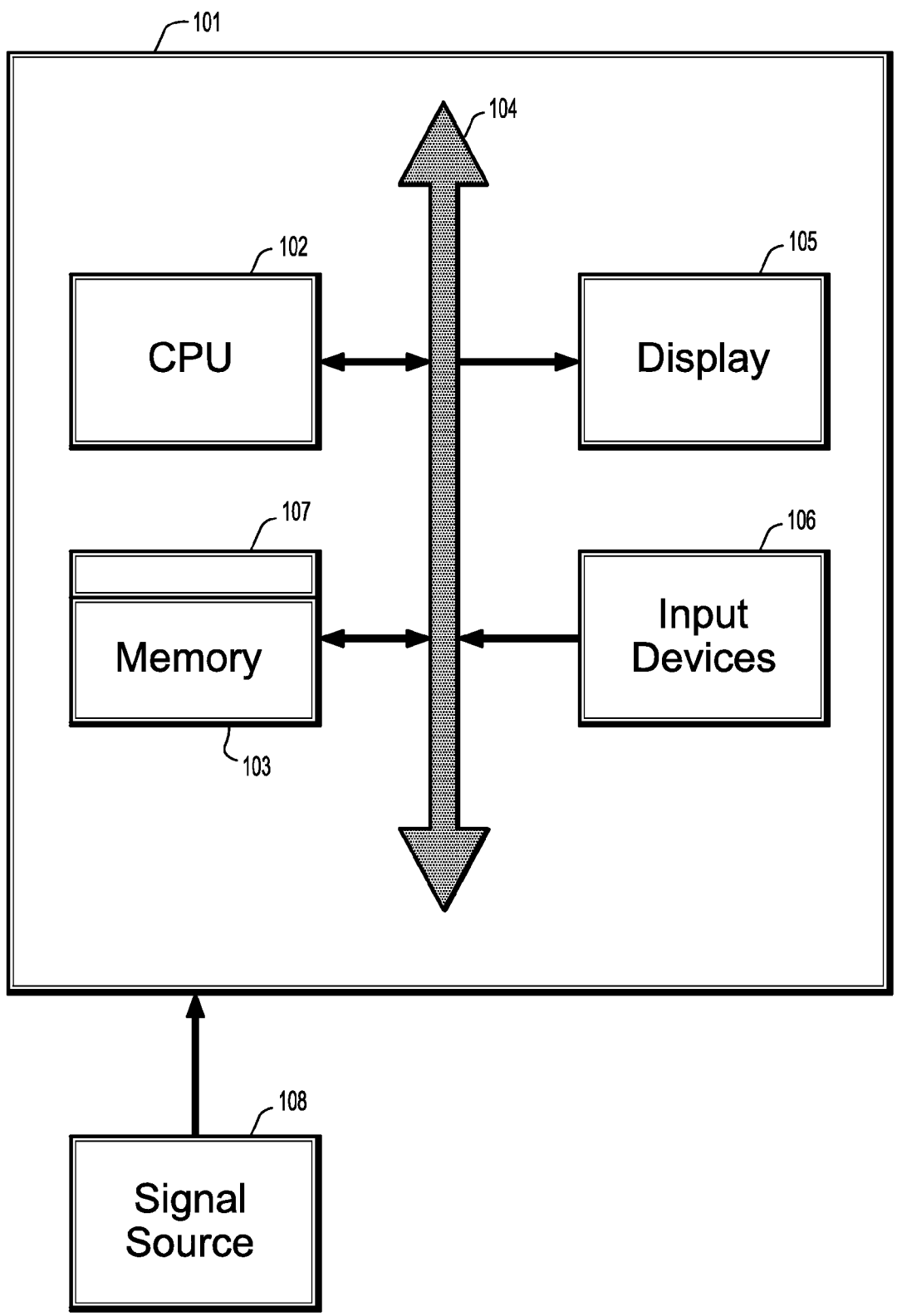
FIG. 10 is a block diagram of an exemplary computer system for implementing a method for constructing a shape-tree and quantifying the shape tree structure, according to an embodiment of the invention.

FIG. 10 is a block diagram of an exemplary computer system for implementing a method for constructing a shape-tree and quantifying the shape tree structure, according to an embodiment of the invention. Referring now to FIG. 10, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of detecting blood vessel bifurcations in digital medical images, comprising the steps of:
   providing a binary segmented 3D image volume having a segmented blood vessel;
   inflating a sphere from a first center point inside a segmented blood vessel until a surface of said sphere intersects a surface of said blood vessel;

searching within the inflated sphere for a second center point that has a sphere intersecting a surface of said blood with a maximum radius;

assigning all voxels of said maximal radius sphere to a root node of a shape-tree;

increasing the radius of said maximal radius sphere, and computing a voxel difference set with respect to the previous maximal radius sphere;

computing one or more connected components $C_m$ in the voxel difference set;

assigning voxels of each connected components to a different child node of said shape tree, and connecting each child node with said root node; and calculating features from said shape tree for training a classifier to detect blood vessel bifurcations.

2. The method of claim 1, wherein said blood vessel surface comprises exterior voxels of said binary segmented 3D image volume.

3. The method of claim 1, wherein said center point is input either manually or by another application.

4. The method of claim 1, further comprising selecting a second center point nearest to said first center point, when there is more than one center point with a maximum radius sphere.

5. The method of claim 1, wherein the radius of said maximal radius sphere is increased by one voxel unit.

6. The method of claim 5, wherein the voxel difference set is defined by $M_k = V(S_{m+k \times U}) - V(S_{m+(k-1) \times U})$, wherein $V(S_r)$ represents a number of voxels inside a sphere of radius r, m is the radius of the maximal radius sphere, k is an iteration counter equal to 1 at a first iteration, and U is said voxel unit.

7. The method of claim 6, further comprising increasing the radius of said maximal radius sphere by another voxel unit, incrementing a level of said shape tree by one, and repeating said steps of computing a voxel difference set, computing one or more connected components, and assigning voxels of each connected components to a different child node, until there are no more connected components in the voxel different set.

8. The method of claim 7, further comprising repeating said steps of computing a voxel difference set, computing one or more connected components, and assigning voxels of each connected components to a different child node, until $m + k \times U \leq R_{max}$, wherein $R_{max}$ is a predetermined maximum.

9. The method of claim 7, wherein at each new shape tree level, the child node of a connected component is connected to a parent node at a previous shape level, wherein a parent node ($N_{(i-1)j}$) represents those voxels at a previous radius that are adjacent to the voxels of said connected component, wherein if there is more than one parent node having voxels adjacent to said connected component, selecting the node with greatest number of adjacent voxels as the parent node.

10. The method of claim 1, wherein said connected components are calculated using a 26-neighbor connectivity in the voxel grid.

11. The method of claim 1, further comprising providing a digital medical image volume, comprising a plurality of intensities associated with an 3-dimensional grid of voxels, wherein said binary segmented 3D image volume is derived from said digital medical image volume.

12. The method of claim 1, further comprising simplifying said shape tree by merging each child node having no sibling nodes with its parent node, and calculating for each branch after merging all consecutive child nodes in said branch, a square sum of the surface area differences between a pair of next-nearest neighbor nodes feature, $$D_1 = \frac{\sum_{i=1}^{n-1}(S_i - S_{i+1})^2}{(n-1) \times \sum_{i=1}^{n-1} D(C_i, C_{i+1})},$$

a sum of the area differences between a first node and a half way node of a shape tree branch, and between the half way node and a last node of said shape tree branch feature, $$D_2 = \frac{(S_1 - S_{n/2})^2 + (S_{n/2} - S_n)^2}{2 \times \sum_{i=1}^{n-1} D(C_i, C_{i+1})},$$

an area difference between the first and last nodes of a shape tree branch feature, $$D_3 = \frac{(S_1 - S_n)^2}{\sum_{i=1}^{n-1} D(C_i, C_{i+1})},$$

and a total branch feature, $D_4 = w_1 \times D_1 + w_2 \times D_2 + w_3 \times D_3$, wherein $S_i$ represents the surface area at the $i^{th}$ node in a branch, $D(C_i, C_{i+1})$ is a distance function between the two center locations $C_i$ and $C_{i+1}$, of $S_i$ and $S_{i+1}$, and n is the number of nodes having only one child, wherein said features $D_1$, $D_2$, $D_3$, and $D_4$ characterize a shape of the vessel represented by said shape tree.

13. A method of detecting blood vessel bifurcations in digital medical images, comprising the steps of:

providing a digital medical image volume, comprising a plurality of intensities associated with an 3-dimensional grid of voxels;

providing a plurality of candidate nodule locations in said image;

segmenting a blood vessel at each candidate location;

inflating a sphere from a first center point inside a segmented blood vessel until a surface of said sphere intersects a surface of said blood vessel;

while increasing the sphere radius beyond the blood vessel surface, computing one or more connected components on a surface of said sphere;

sorting the connected components by a number of voxels in the surfaces; and comparing the number of voxels of a largest connected component surface to a sum of the number of voxels in the next 2 largest connected component surfaces, wherein for a blood vessel bifurcation, the number of voxels of a largest connected component surface is substantially equal to the sum of the number of voxels in the next 2 largest connected component surfaces, and the angles between center points of the connected components.

14. The method of claim 13, wherein the sphere's radius is increased until there are at least three connected components.

15. The method of claim 13, further comprising measuring angles between center points of the connected components, wherein for a for a blood vessel bifurcation, the angles between center points of the connected components should be substantially similar to angles of known blood vessel bifurcations.

16. A non-transitory computer readable medium encoded with a program which when implemented on a computer processor causes the computer to perform the method steps for detecting blood vessel bifurcations in digital medical images, said method comprising the steps of
providing a binary segmented 3D image volume having a segmented blood vessel;
inflating a sphere from a first center point inside a segmented blood vessel until a surface of said sphere intersects a surface of said blood vessel;
searching within the inflated sphere for a second center point that has a sphere intersecting a surface of said blood with a maximum radius;
assigning all voxels of said maximal radius sphere to a root node of a shape-tree;
increasing the radius of said maximal radius sphere, and computing a voxel difference set with respect to the previous maximal radius sphere;
computing one or more connected components $C_m$ in the voxel difference set;
assigning voxels of each connected components to a different child node of said shape tree, and connecting each child node with said root node; and
calculating features from said shape tree for training a classifier to detect blood vessel bifurcations.

17. The non-transitory computer readable medium of claim 16, wherein said blood vessel surface comprises exterior voxels of said binary segmented 3D image volume.

18. The non-transitory computer readable medium of claim 16, wherein said center point is input either manually or by another application.

19. The non-transitory computer readable medium of claim 16, the method further comprising selecting a second center point nearest to said first center point, when there is more than one center point with a maximum radius sphere.

20. The non-transitory computer readable medium of claim 16, wherein the radius of said maximal radius sphere is increased by one voxel unit.

21. The non-transitory computer readable medium of claim 20, wherein the voxel difference set is defined by $M_k=V(S_{m+k\times U})-V(S_{m+(k-1)\times U})$, wherein $V(S_r)$ represents a number of voxels inside a sphere of radius r, m is the radius of the maximal radius sphere, k is an iteration counter equal to 1 at a first iteration, and U is said voxel unit.

22. The non-transitory computer readable medium of claim 21, the method further comprising increasing the radius of said maximal radius sphere by another voxel unit, incrementing a level of said shape tree by one, and repeating said steps of computing a voxel difference set, computing one or more connected components, and assigning voxels of each connected components to a different child node, until there are no more connected components in the voxel different set.

23. The non-transitory computer readable medium of claim 22, the method further comprising repeating said steps of computing a voxel difference set, computing one or more connected components, and assigning voxels of each connected components to a different child node, until $m+k\times U \leq R_{max}$, wherein $R_{max}$ is a predetermined maximum.

24. The non-transitory computer readable medium of claim 22, wherein at each new shape tree level, the child node of a connected component is connected to a parent node at a previous shape level, wherein a parent node ($N_{(i-1)j}$) represents those voxels at a previous radius that are adjacent to the voxels of said connected component, wherein if there is more than one parent node having voxels adjacent to said connected component, selecting the node with greatest number of adjacent voxels as the parent node.

25. The non-transitory computer readable medium of claim 16, wherein said connected components are calculated using a 26-neighbor connectivity in the voxel grid.

26. The non-transitory computer readable medium of claim 16, the method further comprising providing a digital medical image volume, comprising a plurality of intensities associated with an 3-dimensional grid of voxels, wherein said binary segmented 3D image volume is derived from said digital medical image volume.

27. The non-transitory computer readable medium of claim 16, the method further comprising simplifying said shape tree by merging each child node having no sibling nodes with its parent node, and calculating for each branch after merging all consecutive child nodes in said branch, a square sum of the surface area differences between a pair of next-nearest neighbor nodes feature, $$D_1 = \frac{\sum_{i=1}^{n-1}(S_i - S_{i+1})^2}{(n-1)\times \sum_{i=1}^{n-1} D(C_i, C_{i+1})},$$

a sum of the area differences between a first node and a half way node of a shape tree branch, and between the half way node and a last node of said shape tree branch feature, $$D_2 = \frac{(S_1 - S_{n/2})^2 + (S_{n/2} - S_n)^2}{2\times \sum_{i=1}^{n-1} D(C_i, C_{i+1})},$$

an area difference between the first and last nodes of a shape tree branch feature, $$D_3 = \frac{(S_1 - S_n)^2}{\sum_{i=1}^{n-1} D(C_i, C_{i+1})},$$

and a total branch feature, $D_4=w_1\times D_1+w_2\times D_2+w_3\times D_3$, wherein $S_i$ represents the surface area at the $i^{th}$ node in a branch, $D(C_i, C_{i+1})$ is a distance function between the two center locations $C_i$ and $C_{i+1}$, of $S_i$ and $S_{i+1}$, and n is the number of nodes having only one child, wherein said features $D_1$, $D_2$, $D_3$, and $D_4$ characterize a shape of the vessel represented by said shape tree.

* * * * *